US012409805B2

(12) United States Patent
Lepp et al.

(10) Patent No.: US 12,409,805 B2
(45) Date of Patent: Sep. 9, 2025

(54) METHOD AND SYSTEM FOR MULTI-PARTY UNLOCK IN AN INVENTORY TRANSACTION

(71) Applicants: James Randolph Winter Lepp, Ottawa (CA); Michael Peter Montemurro, Toronto (CA); Stephen McCann, Southampton (GB); BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 817 days.

(21) Appl. No.: 16/649,480

(22) PCT Filed: Oct. 6, 2017

(86) PCT No.: PCT/EP2017/075570
§ 371 (c)(1),
(2) Date: Mar. 20, 2020

(87) PCT Pub. No.: WO2019/068358
PCT Pub. Date: Apr. 11, 2019

(65) Prior Publication Data
US 2020/0307512 A1 Oct. 1, 2020

(51) Int. Cl.
*H04L 29/06* (2006.01)
*B60R 25/01* (2013.01)
*B60R 25/102* (2013.01)
*B60R 25/24* (2013.01)
*G06Q 10/08* (2023.01)
*G06Q 10/10* (2023.01)
*H04L 9/30* (2006.01)
*H04L 9/40* (2022.01)
(Continued)

(52) U.S. Cl.
CPC ............ *B60R 25/01* (2013.01); *B60R 25/102* (2013.01); *B60R 25/243* (2013.01); *G06Q 10/08* (2013.01); *G06Q 10/10* (2013.01); *H04L 9/30* (2013.01); *H04L 63/123* (2013.01); *G07C 2009/0023* (2013.01); *H04L 63/0428* (2013.01); *H04W 4/021* (2013.01)

(58) Field of Classification Search
CPC ......... H04L 9/30; H04L 63/123; H04W 4/021
See application file for complete search history.

(56) References Cited

U.S. PATENT DOCUMENTS 9,552,564 B1 * 1/2017 Martenis ............ G07C 9/00571
2004/0178880 A1 9/2004 Meyer et al.
(Continued)

OTHER PUBLICATIONS

European Office Action 1, EP Application No. 17791950.3, OA dated Dec. 4, 2020.
(Continued)

*Primary Examiner* — Wasika Nipa
(74) *Attorney, Agent, or Firm* — Moffat & Co

(57) ABSTRACT

A method for actuating a locking mechanism on a container, the method including receiving, at a computing device associated with the container, a policy for actuating the locking mechanism; determining, at the computing device, that conditions within the policy have been met; and actuating the locking mechanism.

13 Claims, 8 Drawing Sheets

(51) Int. Cl.
 *G07C 9/00* (2020.01)
 *H04W 4/021* (2018.01)

(56) References Cited

U.S. PATENT DOCUMENTS

| | | | | |
|---|---|---|---|---|
| 2005/0083172 A1* | 4/2005 | Bates | ................ | G07C 9/00896 |
| | | | | 340/8.1 |
| 2006/0250235 A1* | 11/2006 | Astrin | ................... | G08B 25/10 |
| | | | | 340/539.22 |
| 2015/0163226 A1* | 6/2015 | Kufluk | ................. | H04W 12/06 |
| | | | | 713/155 |
| 2016/0014131 A1* | 1/2016 | Neafsey | ............. | H04W 12/082 |
| | | | | 713/171 |
| 2018/0270244 A1* | 9/2018 | Kumar | ................. | B64C 39/024 |

OTHER PUBLICATIONS

Anonymous: "Two-man rule—Wikipedia", XP055752458, Wikipedia, retrieved from URL: https://en.wikipedia.org/w/index.php?title=Two-man_rule&oldid=788512041, Jul. 1, 2017.

Anonymous: "Secret Sharing—Wikipedia", XP055752459, Wikipedia, retrieved from URL: https://en.wikipedia.org/w/index.php?title=Secret_sharing&oldid=789010805, Jul. 4, 2017.

European Patent Office, EP Application No. 17791950.3, Summons to Attend Oral Proceedings dated Jun. 4, 2021.

Patent Cooperation Treaty International Searching Authority, International Search Report and Written Opinion for Application No. PCT/EP2017/075570 mailed Dec. 1, 2017.

\* cited by examiner

METHOD AND SYSTEM FOR MULTI-PARTY UNLOCK IN AN INVENTORY TRANSACTION

FIELD OF THE DISCLOSURE

The present disclosure relates to transportation of goods and, in particular, relates to inventory control during transportation of goods.

BACKGROUND

When delivering items by truck, control of inventory is important. A significant portion of "shrinkage" or theft is due to inside jobs, where inventory is stolen by parties who have access to the details and location of the inventory. To avoid this, a common retail practice is for the driver of a delivery truck to be treated as an untrusted party. In such a system, the driver reverses the truck to a central warehouse, but does not have access to the loading docks or the contents of the truck. Upon arrival at the destination, the driver reverses the truck to the loading dock but again does not have access to the contents of the truck or the secure inventory area in the loading dock area.

Typically, the individual who loaded the inventory at the warehouse, such as the shipper, has a key to the trailer and the person who is to receive the inventory at the destination, or the receiver, has another key to the trailer. In such situations, the driver has no access to the trailer or the contents in transit.

However, the distribution of physical keys or combination lock codes is problematic. Generally, a trailer can be unlocked anywhere, whether it is at the intended delivery destination or not. Further, with physical keys, problems exist with losing keys or rapidly re-distributing keys following a security breach. Also, the requirement to pre-distribute keys to both the shipper and receiver is logistically problematic.

With combination locks, the combinations may be intercepted, or information may be given to additional parties. Further, if a combination is not changed often, it is difficult to have visibility or control of who does and does not know the combination. The procedure to manually reprogram a new combination into a physical lock on each trip is cumbersome. Further, once a new combination is set, secure distribution needs to occur, whether by telephone, email or other means to communicate the new combination to the receiver.

Further, using such a system, there is no tracking or logging or auditing of the trail of when and where the trailer was locked or unlocked.

BRIEF DESCRIPTION OF THE DRAWINGS

The present disclosure will be better understood with reference to the drawings, in which.

DETAILED DESCRIPTION

Figure 1:
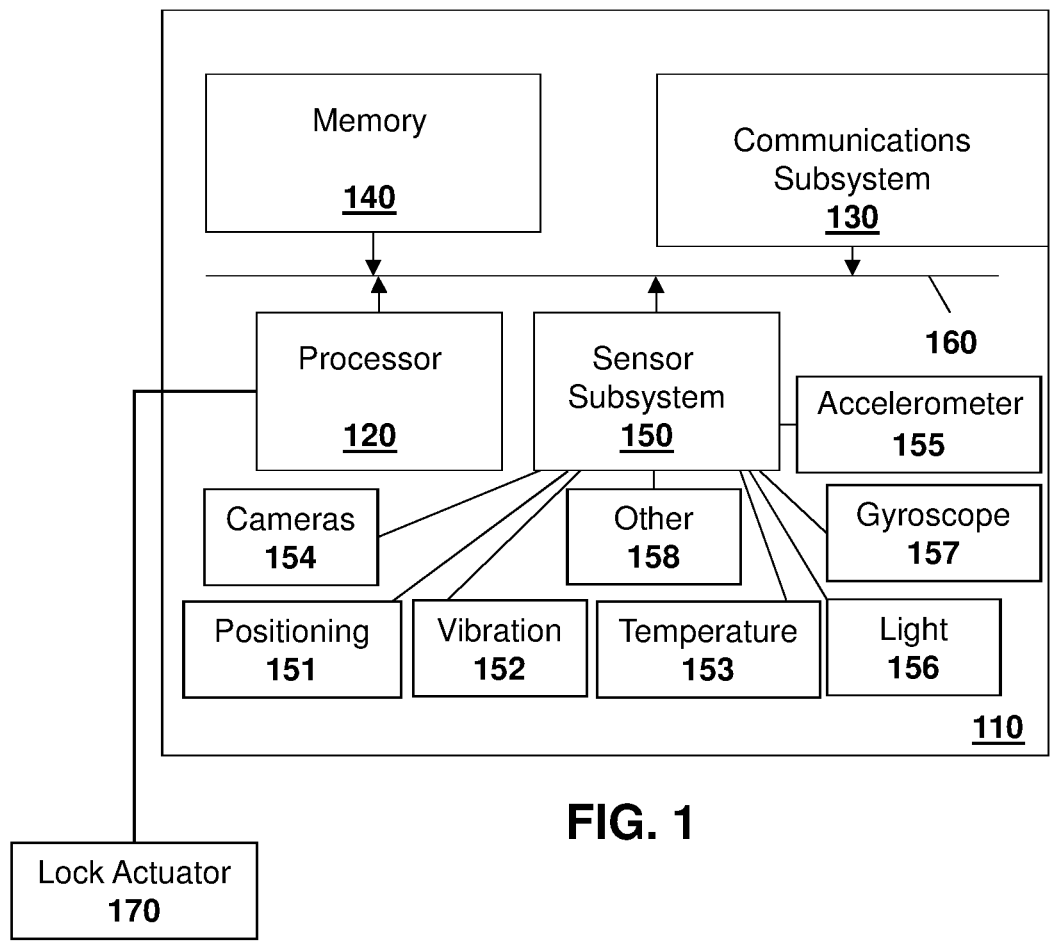
FIG. 1 is a block diagram of an example computing device associated with a container for actuating a locking mechanism on the container.

The present disclosure provides a method for actuating a locking mechanism on a container, the method comprising: receiving, at a computing device associated with the container, a policy for actuating the locking mechanism; determining, at the computing device, that conditions within the policy have been met; and actuating the locking mechanism.

The present disclosure further provides a computing device for actuating a locking mechanism on a container, the computing device comprising: a processor; and a communications subsystem, wherein the computing device is configured to: receive a policy for actuating the locking mechanism; determine that conditions within the policy have been met; and actuate the locking mechanism.

The present disclosure further provides a computer readable medium for storing instruction code for actuating a locking mechanism on a container, the instruction code, when executed by a processor of a computing device causing the computing device to: receive a policy for actuating the locking mechanism; determine that conditions within the policy have been met; and actuate the locking mechanism.

In accordance with the present disclosure, a mechanism for secure locking and unlocking of a container door is provided, using a digital key mechanism. A policy requiring one or more keys may be provisioned for both online and off-line unlocking. The digital lock may function based on the location of the container and may, for example, only allow an unlock operation once the container has arrived at a predetermined destination. In other embodiments, the digital lock may unlock automatically when the container reaches a destination. In other embodiments, the unlocking may occur based on a key and a location being reached. In other cases, a key may be only usable within a geographic area. In still further cases, an override "master" key could exist. Other options are possible.

Further, the system may be tied to external auditing or escrow capabilities.

One example of a computing device associated with a container is provided below. In vehicle operations, sensor systems may be included on the vehicle and include a plurality of sensor apparatuses operating remotely from a central monitoring station to provide remote sensor data to a management or monitoring hub. For example, one sensor system involves fleet management or cargo management systems. In fleet management or cargo management systems, sensors may be placed on a trailer, shipping container or similar product to provide a central station with information regarding the container. Such information may include, but is not limited to, information concerning the current location of the trailer or shipping container, the temperature inside the shipping container or trailer, or that the doors on the shipping container or trailer are closed, whether a sudden acceleration or deceleration event has occurred, the tilt angle of the trailer or shipping container, among other data.

In other embodiments, the computing device may be secured to a vehicle itself. As used herein, the term vehicle can include any self-propelled vehicle such as a truck, tractor, car, boat, aircraft, motorcycle, bicycle, snow machine, among others, and can further include a trailer, shipping container, secure box, sealed envelope, or other such cargo moving container, whether attached to the self-propelled vehicle or not.

In accordance with the embodiments described herein, computing device for a container may be any apparatus that is capable of providing data or information from sensors associated with the computing device to a central monitoring or control station. Further, the computing device has the capability to actuate a locking/unlocking mechanism at the vehicle or container. Sensors associated with the computing device may either be physically part of the sensor apparatus, for example a built-in Global Navigation Satellite System such as a Global Positioning System (GPS) chipset, or may be associated with the computing device through short range wired or wireless communications. For example, a tire pressure monitor may provide information through a Bluetooth™ Low Energy (BLE) signal from the tire to the computing device. In other cases, a camera may be part of the computing device or may communicate with a computing device through wired or wireless technologies. Other examples of sensors are possible.

A central monitoring station may be any server or combination of servers that are remote from the computing device. The central monitoring station can receive data from a plurality of computing devices, and in some cases, may have software to monitor such data and provide alerts to operators if data is outside of the predetermined boundaries.

One computing device for a vehicle or container is shown with regard to FIG. 1. The computing device of FIG. 1 is however merely an example and other computing devices could equally be used in accordance with the embodiments of the present disclosure.

Reference is now made to FIG. 1, which shows an example computing device 110. Computing device 110 can be any device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Computing device 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows computing device 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), IEEE 802.15, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the computing device is intended to operate.

Processor 120 generally controls the overall operation of the computing device 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, computing device 110 may access data or programmable logic from an external storage medium, for example through communications subsystem 130.

In the embodiment of FIG. 1, computing device 110 may utilize a plurality of sensors, which may either be part of computing device 110 in some embodiments or may communicate with computing device 110 in other embodiments. For internal sensors, processor 120 may receive input from a sensor subsystem 150.

Examples of sensors in the embodiment of FIG. 1 include a positioning sensor 151, a vibration sensor 152, a temperature sensor 153, one or more image sensors 154, accelerometer 155, light sensors 156, gyroscopic sensors 157, and other sensors 158. Other sensors may be any sensor that is capable of reading or obtaining data that may be useful for the computing device 110. However, the sensors shown in the embodiment of FIG. 1 are merely examples, and in other embodiments different sensors or a subset of sensors shown in FIG. 1 may be used. For example, in some cases the only sensor may be a positioning sensor such as a Global Navigation Satellite System (GNSS) sensor.

Communications between the various elements of computing device 110 may be through an internal bus 160 in one embodiment. However, other forms of communication are possible.

In accordance with the embodiments of the present disclosure, a lock actuating mechanism 170 may be controlled by computing device 110. Lock actuating mechanism 170 may, for example, include a relay and motor to control the sliding of at least one locking bolt into and out of frame elements on the container. However, other mechanisms to physically lock the door of a container would be known to those in the art, and the present disclosure is not limited to any particular locking mechanism.

Computing device 110 may be affixed to any fixed or portable platform. For example, computing device 110 may be affixed to shipping containers, truck trailers, truck cabs in one embodiment. In other embodiments, computing device 110 may be affixed to any vehicle, including self-propelled vehicles (e.g., automobiles, cars, trucks, buses, bicycles, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, computing device 110 could be carried by a user.

In other cases, computing device 110 may be part of a container that could be carried on or within a vehicle. In accordance with the present disclosure, the term container may include any sort of cargo or item transportation such as vehicles, intermodal containers, aircraft shipping bins, lock boxes, and other similar vessels.

Such a computing device 110 may be a power limited device. For example computing device 110 could be a battery operated device that can be affixed to a shipping container or trailer in some embodiments. Other limited power sources could include any limited power supply, such as a small generator or dynamo, a fuel cell, solar power, energy harvesting, among other options.

In other embodiments, computing device 110 may utilize external power, for example from the engine of a tractor pulling the trailer, from a land power source for example on a plugged in recreational vehicle or from a building power supply, among other options.

External power may further allow for recharging of batteries to allow the computing device 110 to then operate in a power limited mode again. Recharging methods may also include other power sources, such as, but not limited to, solar, electromagnetic, acoustic or vibration charging.

The computing device from FIG. 1 may be used in a variety of environments. One example environment in which the computing device may be used is shown with regard to FIG. 2.

Figure 2:
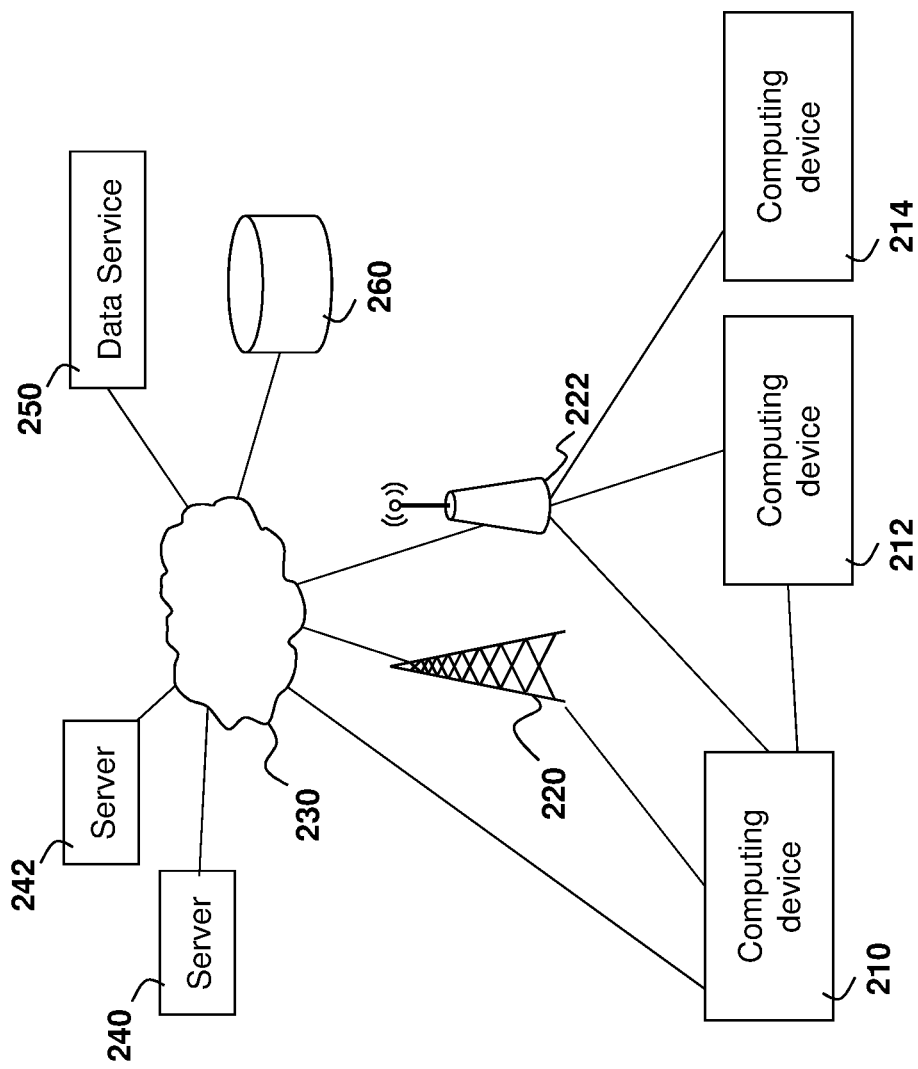
FIG. 2 is a block diagram of an example architecture for the computing device of FIG. 1.

Referring to FIG. 2, three computing devices, namely computing device 210, computing device 212, and computing device 214 are provided.

In the example of FIG. 2, computing device 210 may communicate through a cellular base station 220 or through an access point 222. Access point 222 may be any wireless communication access point.

Further, in some embodiments, computing device 210 could communicate through a wired access point such as Ethernet or fiber, among other options.

The communication may then proceed over a wide area network such as Internet 230 and proceed to servers 240 or 242.

Similarly, computing device 212 and computing device 214 may communicate with servers 240 or server 242 through one or both of the base station 220 or access point 222, among other options for such communication.

In other embodiments, any one of computing devices 210, 212 or 214 may communicate through satellite communication technology. This, for example, may be useful if the computing device is travelling to areas that are outside of cellular coverage or access point coverage.

In other embodiments, computing device 212 may be out of range of access point 222, and may communicate with computing device 210 to allow computing device 210 to act as a relay for communications.

Communication between computing device 210 and server 240 may be one directional or bidirectional. Thus, in one embodiment computing device 210 may provide information to server 240 but server 240 does not respond. In other cases, server 240 may issue commands to computing device 210 but data may be stored internally on computing device 210 until the sensor apparatus arrives at a particular location, possibly during a particular time window. In other cases, two-way communication may exist between computing device 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of computing devices 210, 212, 214, etc. For example, the server may be located essentially anywhere so long as it has network access to communicate with computing devices 210, 212, 214, etc.

Server 240 may, for example, be a fleet management centralized monitoring station. In this case, server 240 may receive information from a sensor apparatus associated with various trailers or cargo containers, providing information such as the location of such cargo containers, the temperature within such cargo containers, any unusual events including sudden decelerations, temperature warnings when the temperature is either too high or too low, among other data. The server 240 may compile such information and store it for future reference. It may further alert an operator. For example, a sudden deceleration event may indicate that a trailer may have been in an accident and the operator may need to call emergency services and potentially dispatch another tractor to the location.

In other embodiments, server 240 may be an inventory tracking server which is used to track inventory location. Such inventory tracking system may be associated with a shipper, a receiver, an auditor, or a transport company, among other options.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions, or may be an inventory control system in some cases.

Data repository or database 260 may for example provide information such as image data associated with a particular location, aerial maps, detailed street maps, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of computing devices 210, 212, or 214 for processing at those sensor apparatuses.

In some cases, server 240 may be used to provide one or more keys to computing device 210. Further, in some cases unlocking or locking actions may take place using server 240. Other options are possible.

A computing device such as that described in FIGS. 1 and 2 above may be used to control the locking and unlocking of a container.

Remote Digital Lock/Unlock

In accordance with a first embodiment of the present disclosure, a container door can be locked and unlocked from a remote location by a user or administrator based on a policy within a computing device on the container. The policy may include keys that may be used for unlocking. Further, in some embodiments the policy may include a geographic location or area in which unlocking of the container is permitted, possibly within a particular time window. In this case, an application or website remote from the container may, for example, present the current location of the container or a time stamped recent location to a user or administrator on the display, where an administrator or user may be able to input a command to unlock the container.

The remote unlocking utilizes keys that can be verified prior to the unlocking of the container. There are a number of options for the implementation of keys. Both server generated key pairs and pre-distributed key pairs are possible.

Possible key implementations include symmetric keys or asymmetric keys such as public/private key pairs. Both types of keys may be generated by a server remote from a computing device associated with the container in some embodiments. However, in other embodiments the computing device itself may generate the encryption keys.

In the case where public and private key pairs are generated on a server, the private keys may be transmitted securely to parties that will do the locking or unlocking. Such parties may include, for example, the sender or receiver, a system administrator, in some cases a driver, in some cases an auditor or other third party to the transaction, among other options.

Further, public keys are transmitted to any party that needs to verify the operation. This may include, for example, the locking device itself, third-party auditors, among other options.

The keys may be embedded in any digital data structure or storage device, including but not limited to certificates such as an X500 series certificate, a USB key, and near field communications (NFC) tag, among other options.

In accordance with one embodiment of the present disclosure, new keys may be generated and transmitted to various parties or devices on a per trip basis, essentially making them one time keys.

Figure 3:
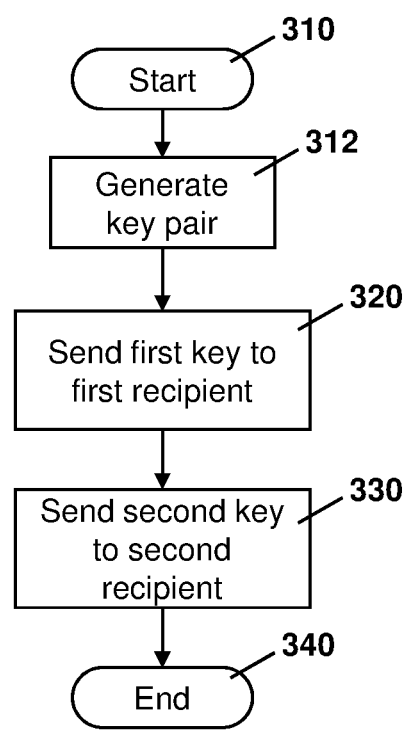
FIG. 3 is a process diagram showing key distribution in accordance with the embodiments of the present disclosure.

Reference is now made to FIG. 3 which shows the process for generating and distributing public and private key pairs.

In particular, the process of FIG. 3 starts at block 310 and proceeds to block 312 in which a trusted server or trusted device generates a key pair. Specifically, the trusted server or trusted device generates a private key and a public key associated with such private key. In some cases, trust may be established based on validation of a signature during key distribution.

From block 312 the process proceeds to block 320 in which the private key is transmitted to a first recipient. The transmission may be directly to the first recipient in some embodiments. In other embodiments, the transmission may be through a server or device. Such first recipient may, for example, be the sender or receiver in one embodiment. In other embodiments, the first recipient may be an administrator responsible for the shipment. In this case, the sending may involve keeping the private key on the same server that generated the public/private key pair, in one instance.

The sending at block 320 would typically be done in a secure manner. For example, the first recipient may have a public/private key pair associated with the device. In this case, the private key may itself be encrypted with the public key of the recipient. In this way, the recipient, upon receiving the encrypted message containing the private key for unlocking or locking the container, will be capable of unencrypting the message using its own private key. However, other options for secure distribution are possible, including tangible memory devices such as USB keys, or other secure mechanisms such as symmetric encryption, among other options.

From block 320 the process proceeds to block 330 in which a public key is sent to a second recipient. The second recipient, as indicated above, may be a computing device associated with the locking mechanism itself, or may be an auditor, among other options. In one embodiment, the public key may be sent encrypted utilizing a public key of the recipient. In other embodiments, the public key may be signed by the server that generated the key pair. In this way, if the recipient knows that the server is a trusted device it may trust the public key for use in subsequent verification operations.

From block 330 the process proceeds to block 340 and ends.

While the embodiment of FIG. 3 provides for public key and private key pair distribution, in other embodiments other encryption technologies may be used. For example, a symmetric key may be generated at the trusted server and distributed securely both to the first recipient and the second recipient. In other cases, the distribution may be done through physical media and, in this case, the keys may be pre-generated and used multiple times.

For example, such pre-generated keys may be embedded in Bluetooth low energy (BLE) beacons, Near Field Communications (NFC) tags, Wi-Fi Aware beacons or Universal Serial Bus (USB) keys, among other options. As an example, an NFC token may be provided inside a security badge name tag. Swiping the NFC tag on NFC reader associated with the computing device on the container may trigger the key verification transaction. If successful, the verification may trigger an unlock operation for the container.

Further, in other embodiments, the key pairs may be generated locally. If done locally, the private key may be transmitted to a server or cloud service. The private key may then be used to initiate and unlock operation and the corresponding public key used to verify it. As such, the verification step can be done on the server in a connected mode scenario, or provisioned in a policy to the computing device onboard the container. In this case, policy data may include necessary public key data transmitted from the server to the computing device.

Once the keys are distributed, such keys may be used to trigger the unlocking of a container door. For example, key verification can involve a challenge where a known "blob" of data is encrypted with a public key that can only be decrypted by the private key. Such an operation verifies the correct private key is present. Such a challenge/response can be entirely executed within the computing device, or the verification can be done by transmitting data through a wireless data connection such as a cellular network to a server.

In some instances, the binary blob being encrypted and decrypted can contain a timestamp, geolocation, or other sensor data, to allow for further verification. The cryptographic unlocking operation can result in signed and verified data for auditing purposes.

Figure 4:
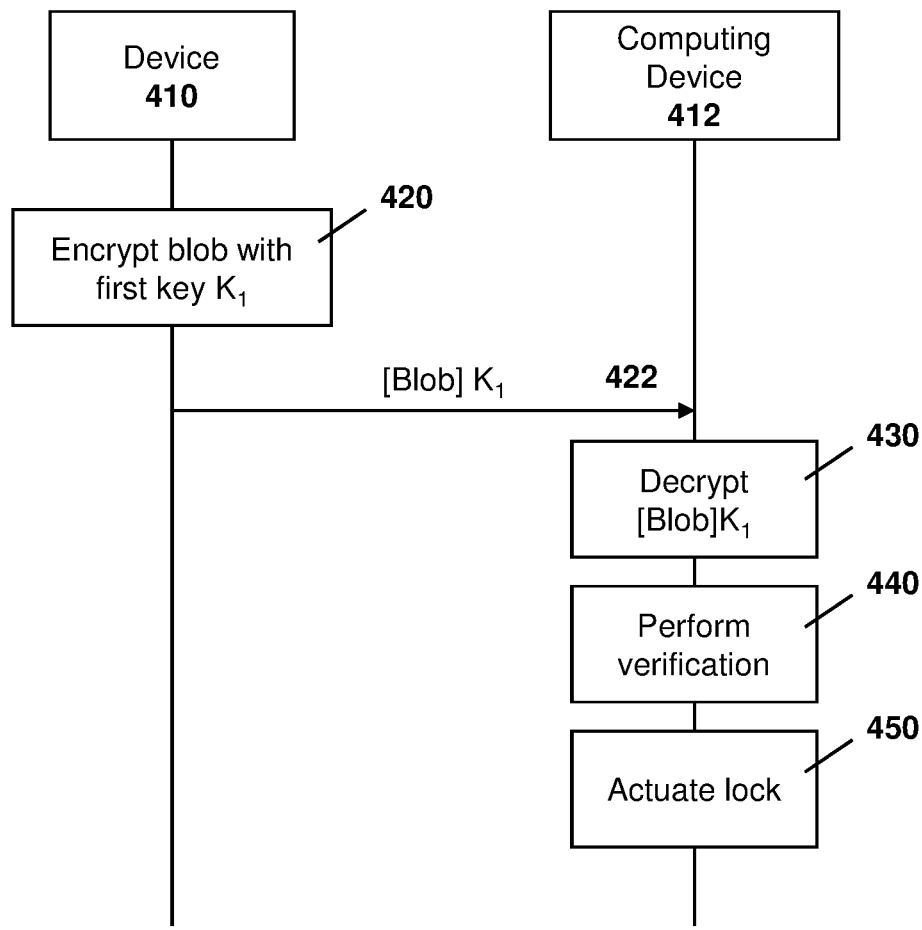
FIG. 4 is a dataflow diagram showing a device providing credentials to a computing device to actuate a locking mechanism on a container.

In particular, reference is now made to FIG. 4. In the embodiment of FIG. 4, a first device 410 communicates with a computing device 412 associated with a locking mechanism.

The first device 410 is the device that is attempting to lock or unlock the container door. For example, first device 410 may be a remote server or computing device, a smartphone, a NFC tag, among other options.

First device 410 may encrypt a blob with a first key, as shown by block 420. Such blob may, for example, be known to both first device 410 and computing device 412. In some cases, the blob may have been received from the computing device 412 at device 410.

The encrypted blob is then sent, as shown by message 422, to the computing device 412.

The computing device 412 may then decrypt the message 422, as shown at block 430.

Encryption and decryption in this case may be based on pre-distributed keys or key pairs.

The decrypted blob is then verified, as shown at block 440. Such verification may confirm that the blob is the known or anticipated message. Further, the verification may include other parameters that are supplemental to the blob itself. For example, the computing device may determine the location of the container and the verification at block 440 may ensure that the computing device is within a certain geographical boundary or a geo-fence, possibly within a particular time window, before the verification at block 440 is successful. In other cases, verification at block 440 may use other policy factors that are provisioned or programed at computing device 412.

Once the policy conditions and decryption are verified at block 440, the process proceeds to block 450 in which the locking mechanism may be actuated to lock or unlock the container. In some embodiments, the electronics may cause the lock or unlock mechanism to physically move. In other embodiments, the electronics may enable or disable the ability for a user to manually engage or disengage the locking device.

The first device 410 may be any device that has a data connection to the computing device 412. Such connection may be a wide area network connection such as over the top (OTT) cellular connection. However, it can also be a short range wired or wireless communication such as wireless local area network (WLAN), Bluetooth™, NFC, USB key, among other options. Thus, the trigger to unlock the door can use a mix of such over-the-top cellular connections to a server, or a local connection for validating the digital key.

The verification at block 440 would be unsuccessful in certain cases if policies with regard to the decryption are not met. For example, if the container is not within a geographic boundary, possibly outside a particular time window, even though the correct key was used, the container remains locked or unlocked.

Device 410 can belong to various parties. These may include the sending party, the driver, a receiving party, an auditor, an administrator, among other options.

Unlocking Based On Geography Only

In a further embodiment, rather than receiving a blob that is encrypted with a key, a policy may be received at the computing device associated with the lock which indicates that the container should be locked or unlocked only within certain geographic locations, possibly within a particular time window.

Figure 5:
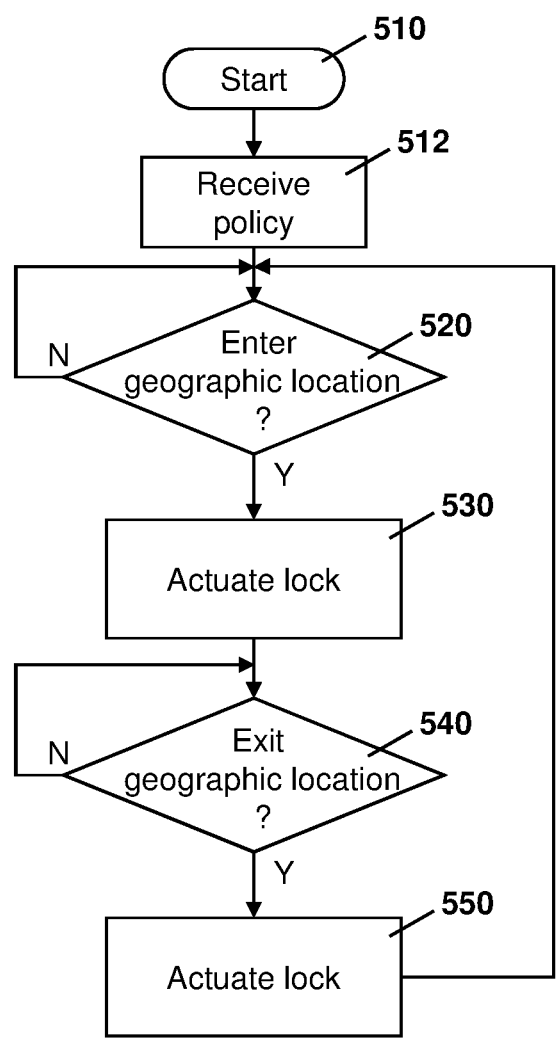
FIG. 5 is a process diagram showing the actuation of a locking mechanism based on geographical location.

For example, reference is now made to FIG. 5. In the embodiment of FIG. 5, the process starts at block 510 and proceeds to block 512 in which the computing device receives a policy. For example, such policy may be received from a server or shipper associated with the container. The policy may be verified for trust purposes. For example, the policy may be signed by a trusted server to ensure the source of the policy.

In the example of FIG. 5, the policy includes automatic unlocking of a door when the container enters a certain area. However, this is merely an example, and in other cases different policies may be distributed.

The process then proceeds to block 520 in which a check is made to determine whether the computing device and container have entered a geographic location that is defined within the received policy. If not, the process continues to loop at block 520.

Once the device enters a geographic location within the policy, the process proceeds from block 520 to block 530 in which the locking mechanism is actuated at the container. For example, when shipping goods from a first location to a second location, one policy may be that the container may only be unlocked when it was reaches a destination location. The determination of whether the destination location has been reached may be based on a geographic boundary, radius from a central point, or other defined area. Further, the determination may be based on whether the unlocking is within a particular time window. Otherwise the container remains locked.

As will be appreciated by those skilled in the art, if the container is automatically unlocked, it may still include a mechanism to keep the doors closed to avoid the doors opening during transit.

From block 530 the process may then, in some embodiments, optionally proceed to block 540 in which a check is made to determine whether the container has left the geographic location. In this case, in some embodiments the shipper may wish to relock the container. Thus, from block 540, if it is determined that the container has not exited the geographic location, possibly within a particular time window, the process may continue to loop on block 540. Otherwise, the process may proceed to block 550 which the locking mechanism may be actuated by the computing device.

The process may then proceed back to block 520 to continue to check whether the device enters a new geographic location as defined by a received policy.

Further, a new policy may replace the policy received at block 512 at any time. Thus, in one case, a policy received on the fly, for example over a cellular connection, may replace the policy received originally at block 512. In this case, the process may proceed to block 520 to check for the new location in the new policy. In this way, an administrator or shipper may allow for the unlocking of the doors in certain situations such as when the container reaches a border crossing, among other options.

Multiple Key Unlock

In a further embodiment, the container may only be unlocked when two or more keys are presented to the computing device. Such keys may take any digital form, but come from two separate parties. For example, the keys may come from the sender of the inventory, such as a central warehouse manager, and from the receiving party, such as a local store inventory manager.

The keyholder parties may be any combination of local or remote parties to the container. The computing device may unlock the door only when both keys are present.

Figure 6:
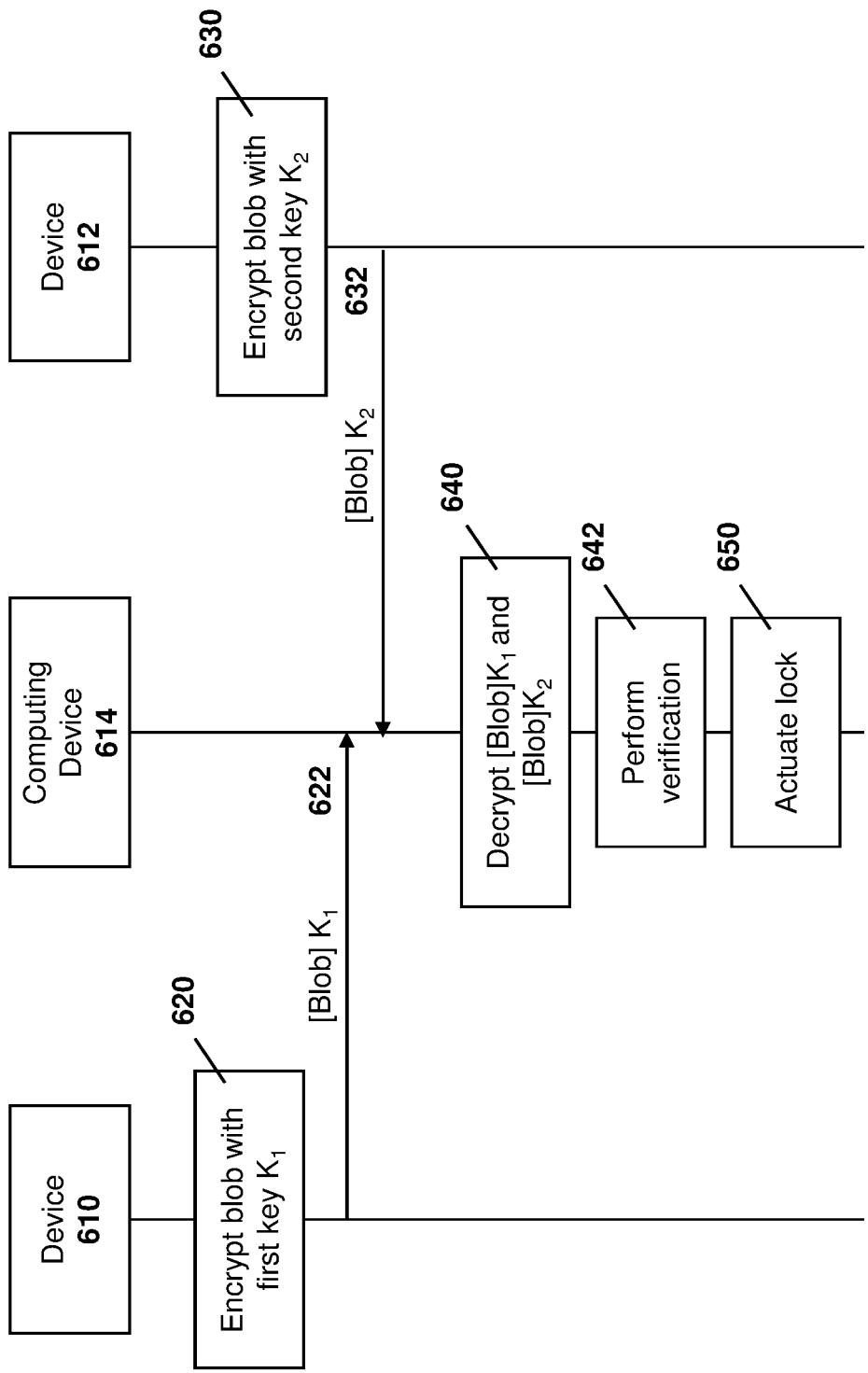
FIG. 6 is a dataflow diagram showing the use of multiple credentials to actuate a locking mechanism at a computing device associated with a container.

Reference is now made to FIG. 6. In the embodiment of FIG. 6, a first device 610 and a second device 612 are the two separate devices that need to provide keys to unlock the container. A computing device 614 controls the unlocking of the container. Computing device 614 may be part of the container and control locking mechanism, or may be a server that will then issue commands to the computing device on the container to unlock the container.

In the embodiment of FIG. 6, first device 610 encrypts a blob with a first key known to the device 610. This is shown in block 620. The first key in this case may be a private key, which may for example have been received from a server or other computing device. The encrypting may be based on a notification to a user of device 610 that a container has reached a destination or a request to verify that unlocking should occur in some cases.

The encrypted blob with the first key is then sent to the computing device 614, as shown by message 622.

Similarly, second device 612 may encrypt a blob with a second key, as shown at block 630. The second key in this case may be a private key, which may for example have been received from a server or other computing device. The encrypting may be based on a notification to a user of device 612 that a container has reached a destination or a request to verify that unlocking should occur in some cases The second device 612 may then forward the encrypted blob to the computing device 614, as shown by message 632.

Once the computing device 614 receives both blobs, it may decrypt the blobs, as shown by block 640. Decryption may, for example, use public keys received from a server or computing device, where the public keys correspond to the first key and second key.

Computing device 614 may then perform a verification, as shown by block 642. For example, the verification may verify that both blobs were successfully decrypted and the blobs contained the expected data. The verification at block 642 may further verify external parameters including the location of the container, or other such information. Other supplementary information may include timestamp, the specific key used, or other sensor information. The verification at block 642 may therefore be based on a policy received at the computing device.

Based on the verification at block 642, the computing device may cause the container to be locked or unlocked depending on the situation. This may be done by the computing device actuating the locking mechanism, as shown by block 650.

While the example of FIG. 6 provides for two devices providing encrypted data, in some cases, computing device 614 may expect keys from three or more devices. For example, three devices may be the sender, the receiver and the transporter. In other cases, the an auditor such as an insurance or financial auditor, among others, may also be involved in unlocking. In other cases, others overseeing the operation could be involved with the unlocking. Therefore, the present disclosure is not limited to only two keys, and in some cases, up to "n" keys may be used for the unlocking process.

As with the embodiment of FIG. 4, the transmission of the keys to the computing device may be done by any local or remote computing device. In this case, the keys may be transmitted through wireless communications such as cellular, satellite, Wi-Fi, WiMAX, NFC, Bluetooth, Bluetooth Low Energy (BLE) or other similar wireless communication, or may be done through wired communications such as by connecting a USB device.

Integration with Inventory Transfer Systems

In each of the embodiments of the FIGS. 4, 5 and 6 above, the triggering of the door locking or unlocking event may also be tied to inventory transfer systems. In particular, an asset tracking service can be integrated with an inventory management system to track contents placed onto a vehicle and then removed from a vehicle. Such system may be a shipping company's internal system, or may be a third-party system including insurance, bondage carrier systems, or escrow.

Such transactions may include an electronic bill of lading to track the change of ownership at the departure/arrival or both, along with any other transactional record-keeping system. A bill of lading is a legal document created by the shipping company that outlines the shipment agreement. It is required before moving the shipment or transferring ownership of the goods to the buyer or destination. It will typically include the type, quantity, and destination of the goods. Such bill of lading acts as a title document for the goods themselves and can be used as a financial security, similar to escrow, to ensure proper actions by all parties involved.

For example, one industry-standard mechanism for electronic bill of lading uses Electronic Shipping Solutions (ESS) Databridge Services and Users Agreement (DSUA) 2013.1. This agreement is widely used by shipping companies around the world and provides tools for all parties in the shipment transaction to "go paperless" while maintaining record-keeping compliance.

Utilizing a device such as that described above with regard to FIG. 1, an accurate timestamp and location may be used as a combined data point and can become part of record-keeping for transactions between the "inventory owner" within a company or between companies. This can be used for legal or financial compliance purposes.

Thus, in accordance with the embodiments the present disclosure, the actuation of the lock to unlock or lock the container can lead to a report being provided to a remote server such as server 242. The report can take the form of an application program interface (API) or web API to conduct transactions between the asset tracking system and an inventory management system. For example, a retailer's website providing a "on hand" inventory at its various locations may be updated instantly when a vehicle such as a truck arrives to deliver items. This enables tracking of inventory in near real time.

Alternatively, a distributed notary such as a block chain can be used to keep track of the inventory transactions as triggered by the tracked container's geolocation and digital key lock/unlock events.

The nature of public key cryptography provides non-repudiation properties. In an asset tracking system, the device keys may be generated for the various parties in the system. This non-repudiation of digital keys provides a basis for the value and trustworthiness of the transaction records.

Combining key information with accurate geolocation and timestamp provides a reliable record of events. Additional conditions recorded by the asset tracking system can be added to the compliance record. These may include the conditions of the vehicle, including the refrigeration temperature within the vehicle, records concerning the route taken, the environmental conditions experienced, sudden acceleration or deceleration events, vibration events such as hitting of significant potholes, among other data that can be recorded with the transaction.

Figure 7:
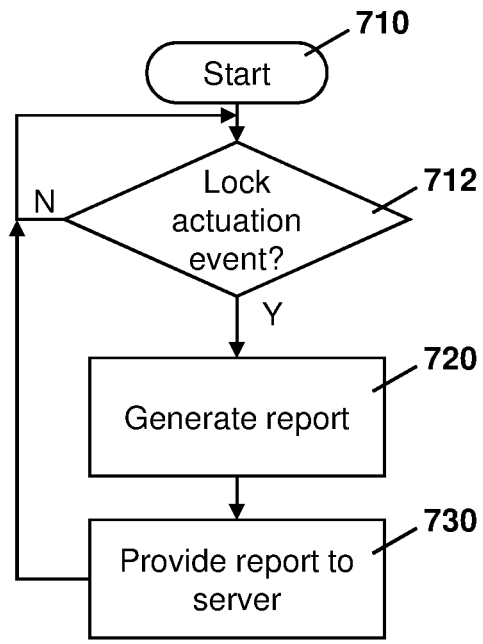
FIG. 7 is a process diagram showing the generation of a report based on a lock actuation event.

Thus, reference is now made to FIG. 7. The process of FIG. 7 starts at block 710 and proceeds to block 712 in which a check is made to determine whether a lock actuation event has occurred. If no, the process continues to loop back to block 712.

Once a lock activation at event has been detected, the process proceeds to block 720 in which the computing device may generate a report with regard to the lock actuation event. Such report may contain information such as whether the door was locked or unlocked, the location of the container, a timestamp, among other supplementary information. In some cases, the report may indicate various conditions such as internal or external temperatures for the container, whether an alarm condition exists such as using an override key to open the container, among other such factors.

From block 720, the process proceeds to block 730 in which the report is provided to a server. The provision of the report to a server may be done over a wired or wireless connection. For example, in one embodiment the report may be sent immediately through a cellular or satellite connection. In other cases, the report may be stored at the computing device until certain conditions exist, such as the container having access to a Wi-Fi network for example. Other options for providing the report at block 730 are possible.

From block 730, the process may then proceed back to block 712 in which the computing device waits for the next lock actuation event.

Loss of Connectivity

In some embodiments, as a stand-alone solution or as a backup system in case of loss of connectivity, the lock mechanism can be triggered using a local key. For example, in some cases an emergency override may be needed to unlock the container. Such a mode can be enabled or disabled in the system.

If an emergency unlock is used, the computing device associated with the container can log the location and timestamp of the event, and a report in accordance with the embodiment of FIG. 7 can be sent, for example when connectivity is reestablished. The report can be used to generate an alarm or warning notification to be sent to all interested parties in the inventory. For example, such message may indicate emergency unlock override, activation time and location.

Such emergency override may be provided using a physical key in some embodiments. However, in other embodiments the override may be based on an electronic key. Further, in some cases override may involve contacting one or a combination of the sender, receiver, or transporter to provide information with emergency unlocking. A policy used to specify one or more override keys, which parties can provide the emergency override, a time or location where override is acceptable, among other options, could be provisioned on the computing device associated with the lock Specifically, with regard to the electronic key, the off-line unlock may be stored in a "unlock policy" containing coordinates that enable the container to be unlocked within a geo-fenced area, possibly within a particular time window. For example, the destination location can be programmed at the time of departure and the lock only opens when at the destination geolocation. This does not require network connectivity while on the journey or even at the destination. In this case the unlocking would typically include a separate locking mechanism and latch so that the door does not swing open freely when the destination is reached.

Figure 8:
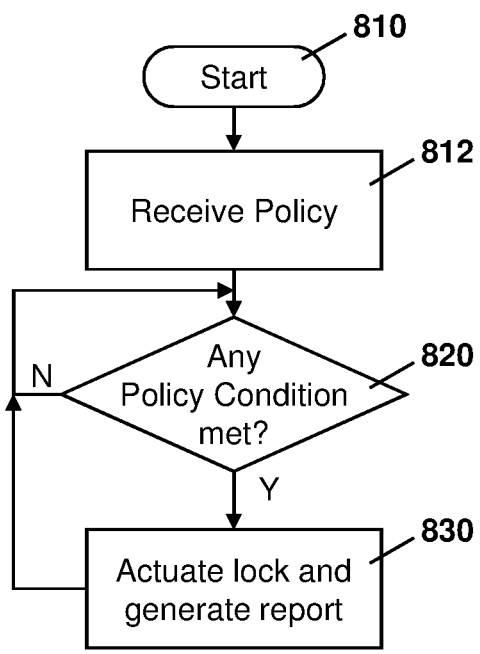
FIG. 8 is a process diagram showing the provisioning of a policy and the actuation of a locking mechanism based on conditions within the policy.

In order to achieve the unlocking capabilities offline, policy information containing conditions required to unlock the container are provisioned into a computing device associated with the container before or during the trip. Reference is now made to FIG. 8.

In particular, the process of FIG. 8 starts at block 810 and proceeds to block 812 in which the computing device associated with the locking mechanism receives a policy. Such policy may indicate that the device can be unlocked in certain situations. For example, a single or dual key scenarios of FIGS. 4 and 6 above may be required in most cases. However, an emergency unlock key may be provisioned in to the lock as a secondary unlocking mechanism. The policy may indicate data such as which keys, which locations, which proximity trigger, the time at which the door can be opened, any delays prior to opening the door, among other such information.

For example, the policy received at block 812 may involve special access granted to the driver for emergency situations such as a roadside police inspection, customs border crossing, safety issues, livestock issues if transporting livestock, among other such situations. In this case, the policy allows for emergency unlocking of the container by a party that is not the receiver, but such event is recorded within a tracking system.

One example policy that can be received combines a set of keys with a set of locations. Some keys may only be allowed to unlock at specific locations, each key tied to a specific place. Another master key may be able to unlock at any location. Many other combinations of criteria making up a policy are possible.

The process then proceeds from block 812 to block 820 in which a check is made to determine whether any of the policy conditions have been met. This could involve the normal unlocking based on the policy, as well as emergency or non-connection unlocking in some situations.

From block 820, if the policy conditions have not been met, the process proceeds to loop back to block 820 to continue checking for the policy conditions being met.

From block 820, once the policy conditions are met, the process proceeds to block 830 in which the locking mechanism may be actuated. Such an actuation event may include generating a report to allow tracking and alarms.

From block 830, the process proceeds back to block 820 to check for other policy conditions.

The policy received at block 812 above can be provisioned on a per trip basis, on a round-trip basis, on a per driver basis, or for a certain period of time. This is similar to how keys may be provisioned for one-time use and, in this case, the policy can be for a one-time use.

The provisioning at block 812 may occur while network conductivity exists. However, in some situations the provisioning may occur through a local wired or wireless connection. In this case, a trust mechanism to ensure the validity of the policy may be implemented. For example, the policy that is received may be signed by a trusted authority known to the computing device prior to the computing device implementing such policy.

Further, in some embodiments the policy may be dynamically updated. In this case, as long as the computing device has a network connection such as a cellular or satellite connection, then the policy that is received may be updated. Again, the policy may be sent from a trusted authority and may be signed accordingly. In this case, only those policies received from trusted authorities would be implemented by the computing device.

Adjustable Security

A computing device such as that described above with regard to FIG. 1 may be a power limited device operating on a battery. In this case, the cost of providing the level of security described above with regard to the embodiments of FIGS. 4 to 8 may come with a cost in terms of both battery power and mobile data.

In the real world, some inventory may be worth tracking more closely than others, and may thus require closer to real-time monitoring or having complex locking requirements. In other cases, inventory that is not as important may be tracked less closely, resulting in saving battery power or mobile data.

Further, high importance or high-value cargo may be transported in the same container as low value inventory. For example, a truck may make an eastward trip with high-value inventory and return the following day with a load of empty cardboard boxes.

To adjust for these requirements, the locking system and tracking system may be adjustable on a time schedule or per trip basis.

In this case, the policy on the computing device associated with the container may provide for adjustable security. For example, a trip may be fed into the system and commands may be sent from a server over a network to the computing device to provision for all legs of the trip. The computing device reconfigures the reader parameters and sensor parameters, including reporting frequency, sensor reading frequency, among other factors, according to the provisioning commands that are sent. Such provisioning commands may, for example, involve the policy that is received at block 812 at the locking mechanism.

In particular, the policy received at block 812 may be programmed for different legs of the trip. Thus, for a first leg of the trip, a first set of policies may be implemented. Once the sensors detect that the container has reach its destination and the container has been opened, a second set of policies may be implemented at the computing device. Such second set of policies may have been received at the initial provisioning of the policy at the computing device prior to the initial trip.

Alternatively, subsequent legs of the trip can be provisioned into the computing device from a cloud service or from other network locations as the previous leg completes. In this case, the opening of the doors may trigger a server in a cloud or on the network to send an updated policy to the computing device.

In addition to the destination location, more policy parameters can be built into the embodiments of the present disclosure. For example, the policy may contain more than just a geo-fence and/or time window by requiring that the unlocking occurs by specific mechanisms such as an NFC tag, Bluetooth Beacon or Personal Identification Number (PIN) code. Further, data may include such things as environmental issues such as ambient temperature. Multiple trips can be built into the solution, such as when one container opens and closes at different locations, allowing the same or different parts of the container contents to be accessed.

Based on the above, a computing device associated with a container may use a policy received from a server to allow the locking and unlocking of the container once policy conditions are met. Such policy conditions may include various keys to be used, how keys need to be combined, location, time, sensor data, environmental conditions and/or other factors to allow for the unlocking. Logging of the actuation of the lock, along with supplemental information, may provide for integration into inventory tracking systems.

A server such as servers 240,242 or 250 may be any network node. For example, one simplified server that may perform the embodiments described above is provided with regards to FIG. 9.

Figure 9:
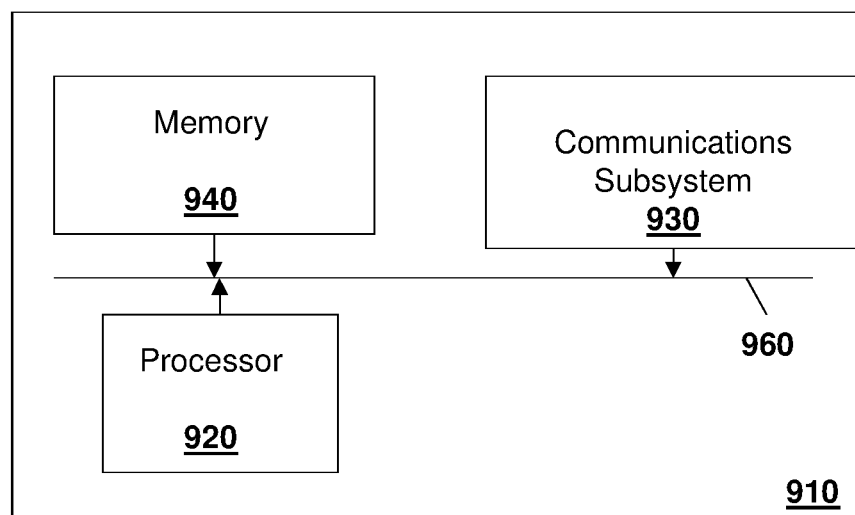
FIG. 9 is a block diagram of an example computing device or server capable of being used with the embodiments of the present disclosure.

In FIG. 9, server 910 includes a processor 920 and a communications subsystem 930, where the processor 920 and communications subsystem 930 cooperate to perform the methods of the embodiments described herein.

The processor 920 is configured to execute programmable logic, which may be stored, along with data, on the server 910, and is shown in the example of FIG. 9 as memory 940. The memory 940 can be any tangible, non-transitory computer readable storage medium, such as optical (e.g., CD, DVD, etc.), magnetic (e.g., tape), flash drive, hard drive, or other memory known in the art. In one embodiment, processor 920 may also be implemented entirely in hardware and not require any stored program to execute logic functions.

Alternatively, or in addition to the memory 940, the server 910 may access data or programmable logic from an external storage medium, for example through the communications subsystem 930.

The communications subsystem 930 allows the server 910 to communicate with other devices or network elements.

Communications between the various elements of the server 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method for actuating a locking mechanism on a container, the method comprising:
receiving, at a computing device associated with the container, a policy for actuating the locking mechanism, wherein the policy includes a first public key associated with a first computing device and a second public key associated with a second computing device, wherein the first public key and the second public key are distinct, the first public key being part of a first private-public key pair with a first private key, the second public key being part of a second private-public key pair with a second private key;
providing a first expected blob to the first computing device;
providing a second expected blob to the second computing device;
determining, at the computing device, that conditions within the policy have been met, the determining comprising:
receiving an encrypted blob from the first computing device encrypted with the first private key;
receiving a second encrypted blob from the second computing device encrypted with the second private key;
decrypting the first encrypted blob and the second encrypted blob to create a first blob and a second blob; and
verifying the contents of the first blob and the second blob, the verifying comprising finding that the first blob corresponds to the first expected blob and finding that the second blob corresponds to the second expected blob; and
upon verifying the contents of the first blob and the second blob, actuating the locking mechanism;
wherein the policy includes an emergency override key, and if the emergency override key is used, providing an alarm to a server; and
wherein the policy includes different conditions for different legs of a trip.

2. The method of claim 1, wherein the policy includes at least one public key to be used for the actuating.

3. The method of claim 1, wherein the policy includes at least one supplementary data item selected from: a geographic location within which the locking mechanism may be actuated; a time within which the locking mechanism may be actuated; or sensor reading ranges for sensors associated with the computing device within which the locking mechanism may be actuated.

4. The method of claim 1, further comprising generating a report based on the actuating, the report including at least a location, timestamp and whether the locking mechanism was locked or unlocked.

5. The method of claim 4, further comprising providing the report to an inventory tracking system.

6. The method of claim 1, wherein the receiving is done dynamically while a vehicle associated to the container is in motion.

7. A computing device for actuating a locking mechanism on a container,
the computing device comprising:
a processor; and
a communications subsystem,
wherein the computing device is configured to:
receive a policy for actuating the locking mechanism, wherein the policy includes a first public key associated with a first computing device and a second public key associated with a second computing device, wherein the first public key and the second public key are distinct, the first public key being part of a first private-public key pair with a first private key, the second public key being part of a second private-public key pair with a second private key;
provide a first expected blob to the first computing device;
provide a second expected blob to the second computing device;
determine that conditions within the policy have been met, the determining comprising:
receiving an encrypted blob from the first computing device encrypted with a private key associated with the first public key;

receiving a second encrypted blob from the second computing device encrypted with a second private key associated with the second public key;

decrypting the first encrypted blob and the second encrypted blob to create a first blob and a second blob; and verifying the contents of the first blob and the second blob, the verifying comprising finding that the first blob corresponds to the first expected blob and finding that the second blob corresponds to the second expected blob; and upon verifying the contents of the first blob and the second blob, actuate the locking mechanism;

wherein the policy includes an emergency override key, and if the emergency override key is used, provide an alarm to a server; and wherein the policy includes different conditions for different legs of a trip.

8. The computing device of claim 7, wherein the policy includes at least one public key to be used for the actuating.

9. The computing device of claim 7, wherein the policy includes at least one supplementary data item selected from: a geographic location within which the locking mechanism may be actuated; a time within which the locking mechanism may be actuated; or sensor reading ranges for sensors associated with the computing device within which the locking mechanism may be actuated.

10. The computing device of claim 7, wherein the computing device is further configured to generate a report based on the actuating, the report including at least a location, timestamp and whether the locking mechanism was locked or unlocked.

11. The computing device of claim 10, wherein the computing device is further configured to provide the report to an inventory tracking system.

12. The computing device of claim 7, wherein the computing device is configured to receive dynamically while a vehicle associated to the container is in motion.

13. A non-transitory computer readable medium for storing instruction code for actuating a locking mechanism on a container, the instruction code, when executed by a processor of a computing device causing the computing device to:

receive a policy for actuating the locking mechanism, wherein the policy includes a first public key associated with a first computing device and a second public key associated with a second computing device, wherein the first public key and the second public key are distinct, the first public key being part of a first private-public key pair with a first private key, the second public key being part of a second private-public key pair with a second private key;

providing a first expected blob to the first computing device;

providing a second expected blob to the second computing device;

determine that conditions within the policy have been met, the determining comprising:

receiving an encrypted blob from the first computing device encrypted with a private key associated with the first public key;

receiving a second encrypted blob from the second computing device encrypted with a second private key associated with the second public key;

decrypting the first encrypted blob and the second encrypted blob to create a first blob and a second blob; and verifying the contents of the first blob and the second blob, the verifying comprising finding that the first blob corresponds to the first expected blob and finding that the second blob corresponds to the second expected blob; and upon verifying the contents of the first blob and the second blob, actuate the locking mechanism;

wherein the policy includes an emergency override key, and if the emergency override key is used, providing an alarm to a server; and wherein the policy includes different conditions for different legs of a trip.

* * * * *